(12) United States Patent
Nicolini

(10) Patent No.: US 7,490,811 B2
(45) Date of Patent: Feb. 17, 2009

(54) DIAPHRAGM VALVE FOR COMPRESSED OR LIQUEFIED GASES

(75) Inventor: Giancarlo Nicolini, Villanuova Sul Clisi (IT)

(73) Assignee: Pergola S.R.L., Calcinato (IT)

( * ) Notice: Subject to any disclaimer, the term of this patent is extended or adjusted under 35 U.S.C. 154(b) by 236 days.

(21) Appl. No.: 11/365,597

(22) Filed: Mar. 2, 2006

(65) Prior Publication Data

US 2007/0131890 A1    Jun. 14, 2007

(30) Foreign Application Priority Data

Dec. 13, 2005  (EP) ................... 05425884

(51) Int. Cl.
    *F16K 31/44* (2006.01)
(52) U.S. Cl. ..................... 251/229; 251/276; 251/335.2
(58) Field of Classification Search ................. 251/229, 251/331, 335.2, 274–278, 264
See application file for complete search history.

(56) References Cited

U.S. PATENT DOCUMENTS

| 4,171,792 A | * | 10/1979 | Bass ........................ 251/335.2 |
| 4,606,374 A | * | 8/1986 | Kolenc et al. ............ 251/335.2 |
| 4,760,990 A |   | 8/1988 | Kerger et al. |
| 5,188,338 A | * | 2/1993 | Itoi ......................... 251/335.2 |
| 5,215,286 A | * | 6/1993 | Kolenc ..................... 251/229 |
| 5,413,311 A | * | 5/1995 | Arstein et al. ............... 251/229 |
| 5,516,078 A |   | 5/1996 | Wellener, III et al. |
| 5,669,414 A | * | 9/1997 | Miller ..................... 251/335.2 |
| 5,829,472 A |   | 11/1998 | Greenwood et al. |
| 6,189,861 B1 | * | 2/2001 | Gotch et al. ............. 251/335.2 |
| 6,554,251 B2 | * | 4/2003 | Takeda et al. ............ 251/335.2 |

* cited by examiner

*Primary Examiner*—John Bastianelli
(74) *Attorney, Agent, or Firm*—Modiano & Associati; Albert Josif; Daniel J. O'Byrne

(57) ABSTRACT

A diaphragm valve for compressed or liquefied gases, comprising a valve body which forms an inlet which can be associated with a pressurized gas cylinder and forms a gas outlet port. A closure port is provided between the inlet and the outlet port, and a gasket acts on the closure port and is supported by a flow control element, which engages the internal face of a diaphragm, on the outer face whereof there acts a pusher piston, which can be actuated by means of an external knob. Between the diaphragm and the pusher piston, at least one metallic disk being arranged which is not retained at its edges.

5 Claims, 4 Drawing Sheets

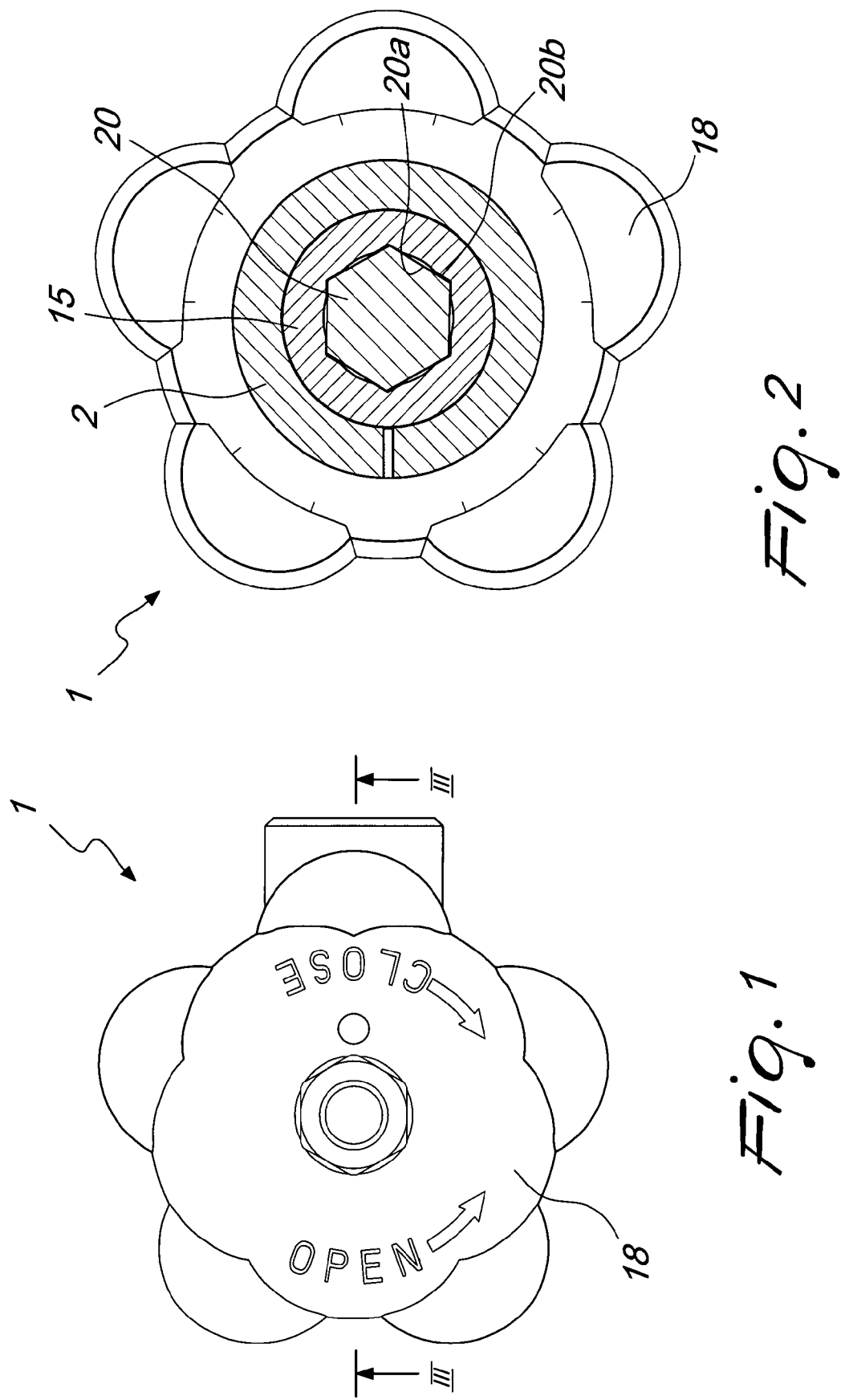

DIAPHRAGM VALVE FOR COMPRESSED OR LIQUEFIED GASES

The present invention relates to a diaphragm valve for compressed or liquefied gases.

BACKGROUND OF THE INVENTION

As is known, a problem which is currently strongly felt in the production of diaphragm valves for compressed or liquefied gases relates to the wear of the diaphragm that occurs after a certain number of actuations.

These valves, generally speaking, have a valve body which can be associated with a cylinder of pressurized gas and defines a gas outlet port. A closure port is formed internally, and the gas that arrives from the cylinder passes through it; a gasket acts on said closure port and is supported by a flow control element, which engages in an upward region a diaphragm which in practice closes hermetically the region where the closure port is located.

A pusher piston acts on the diaphragm and can be actuated externally by means of a knob or the like, so as to achieve the translational motion of the flow control element in order to open and close the valve.

The action of the pusher piston on the diaphragm inevitably produces folds and wrinkles arising from the variation of the shape assumed by the diaphragm in the various steps of actuation, and therefore leaks can occur over time.

In order to try to solve the problem, U.S. Pat. No. 4,760,990 discloses a solution in which a plastic washer is provided which, by moving together with the pusher piston, allows to compensate for the major discontinuities but not to eliminate them completely.

Another problem further arises from the fact that rotation of the pusher piston actuation rod inevitably causes rotation of the pusher piston and therefore introduces friction and wear, which are very dangerous for the integrity of the diaphragm.

SUMMARY OF THE INVENTION

The aim of the invention is to eliminate the drawbacks mentioned above by providing a diaphragm valve for compressed or liquefied gases which allows to limit the deformations that the diaphragm can undergo, allowing to achieve perfect continuity in the geometry of the diaphragms which are stressed at high pressure.

Within this aim, an object of the invention is to provide a diaphragm valve in which it is possible to prevent friction between the pusher piston and the diaphragm, thus achieving a considerable increase in the service life of the diaphragm and avoiding any sliding friction.

Another object of the present invention is to provide a diaphragm valve which, thanks to its particular constructive characteristics, is capable of giving the greatest assurances of reliability and safety in use.

Another object of the present invention is to provide a diaphragm valve for compressed or liquefied gases which can be obtained easily starting from commonly commercially available elements and materials and is further competitive from a merely economical standpoint.

This aim and these and other objects, which will become better apparent hereinafter, are achieved by a diaphragm valve for compressed or liquefied gases, according to the invention, comprising a valve body which defines an inlet which can be associated with a pressurized gas cylinder and forms a gas outlet port, a closure port being provided between said inlet and said outlet port, a gasket acting on said closure port and being supported by a flow control element, which engages the internal face of a diaphragm, which is directly engaged between the valve body and a ring-shaped protruding portion of a bush on the outer face whereof there acts a pusher piston, which can be actuated by means of an external knob, characterized in that it comprises, between said diaphragm and said pusher piston, at least one metallic disk having a diameter that is less than the diameter of said diaphragm such that said at least one metallic disk is arranged inside said ring-shaped protruding portion.

BRIEF DESCRIPTION OF THE DRAWINGS

Further characteristics and advantages will become better apparent from the description of a preferred but not exclusive embodiment of a diaphragm valve for compressed or liquefied gases, illustrated by way of non-limiting example in the accompanying drawings, wherein:

FIG. 1 is a schematic plan view of the valve;

FIG. 2 is a sectional view, taken along the line II-II of FIG. 3;

DESCRIPTION OF THE PREFERRED EMBODIMENTS

Figure 3:
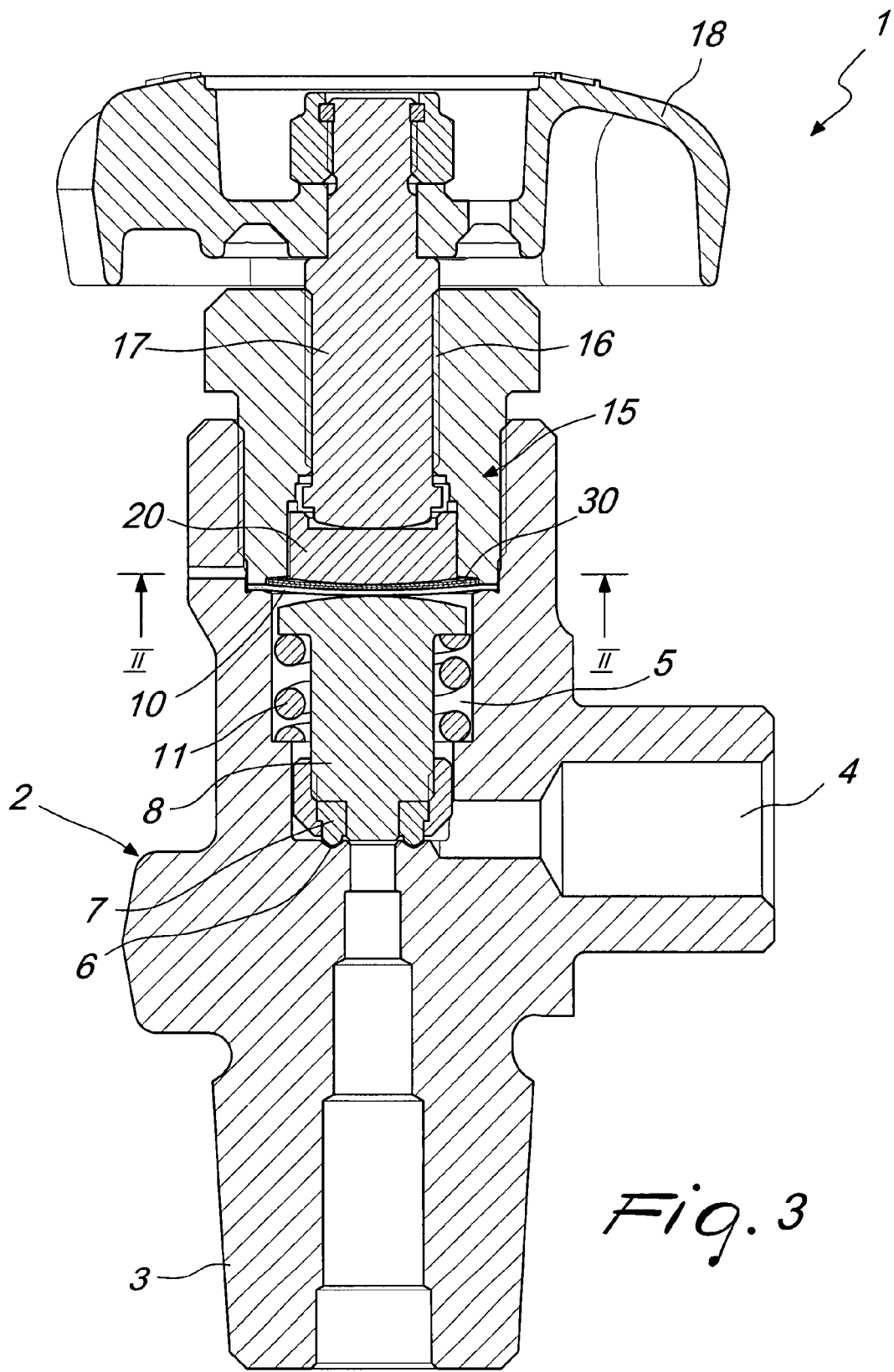
FIG. 3 is a sectional view, taken along the line III-III of FIG. 1.
Figure 4:
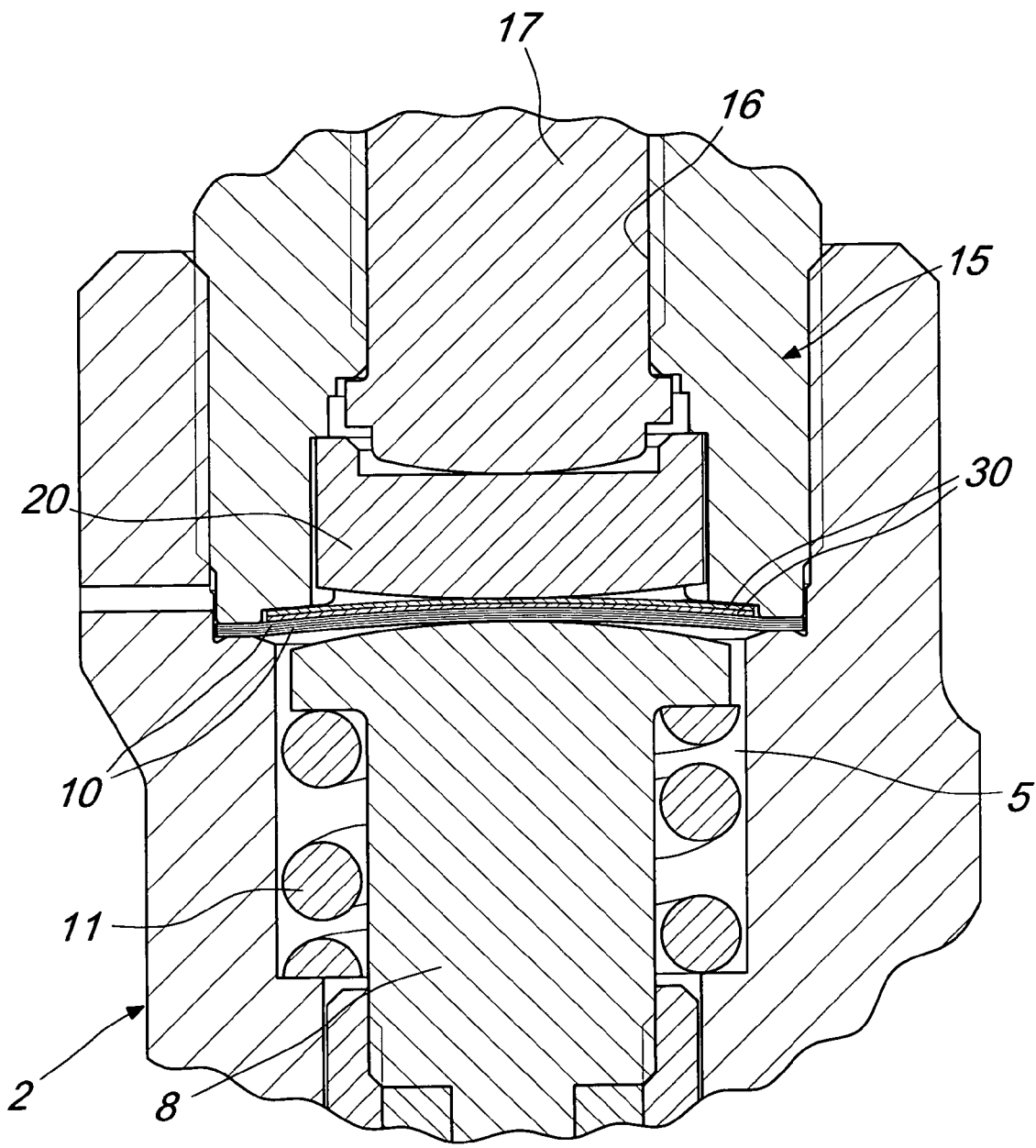
FIGS. 4 and 5 are highly enlarged-scale views of the detail of the region of the diaphragm in the two different closure and opening positions.
Figure 5:
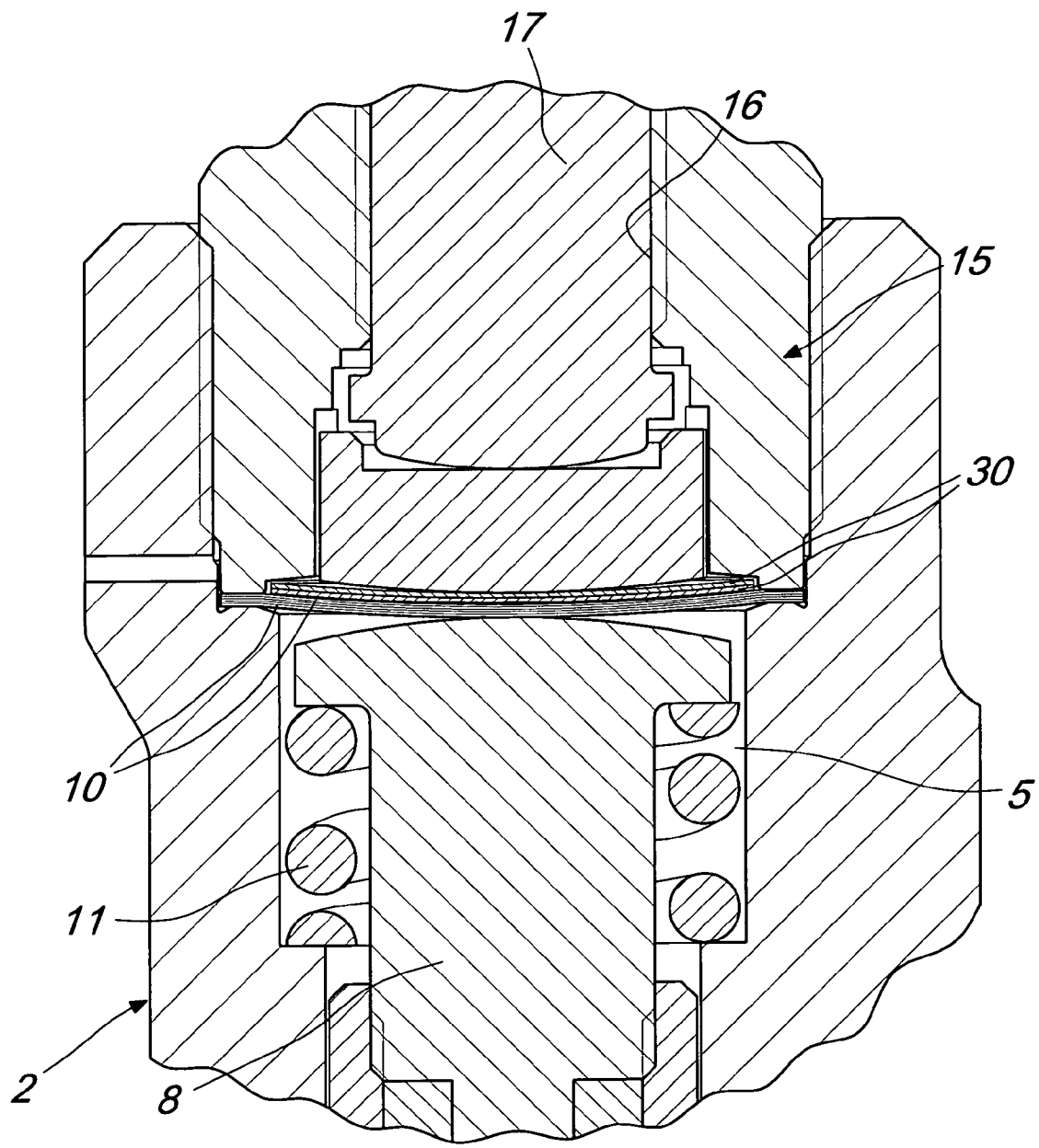

With reference to the figures, the diaphragm valve for compressed or liquefied gases according to the invention, generally designated by the reference numeral 1, comprises a valve body 2, which is provided with the conventional threaded inlet 3 for connection to a pressurized gas cylinder.

The body 2 defines a gas outlet port 4, which is connected to an internal chamber 5, which has a closure port 6 for connection to the inlet.

A sealing gasket 7 acts on the closure port 6 and is supported by a flow control element 8, which engages the internal face of a diaphragm 10, which closes the chamber 5 practically hermetically.

A pusher spring 11 acts on the flow control element and tends to move the gasket 7 away from the closure port 6.

In a per se known manner, the diaphragm 10 is provided by means of a plurality of layers, which are kept in position by engaging the axial end of a bush 15, which is connected to the upper part of the valve body 2 and forms a threaded portion 16 for engagement with the threaded rod 17, which is connected to an actuation knob 18 which can be accessed from the outside.

The threaded rod 17 engages a pusher piston 20, which pushes the diaphragm 10 in contrast with the action of the spring 11.

The particular feature of the invention consists in that between the pusher piston 20 and the diaphragm 10 there is at least one metallic disk having a diameter that is less than the diameter of said diaphragm such that said at least one metallic disk is arranged inside said ring-shaped protruding portion and are designed to provide a continuity in the deformed geometry of the underlying diaphragm, which is stressed by pressure.

In this manner, the thrust applied to the diaphragm is evenly distributed, preventing the occurrence of wrinkles or in any case of deformations which, as the actuations are repeated, might damage the diaphragm.

Another important aspect of the invention further consists in that the pusher piston 20 is provided with rotation-preventing means in order to prevent the occurrence of sliding friction between the pusher and the disks, which would lead to damage of the diaphragm.

The rotation-preventing means are obtained by means of a polygonal shape 20*a* of the pusher piston 20, which by engaging a polygonal seat 20*b* formed by the bush 15 can perform a translational motion due to the action of the thrust applied by the rod 17 which is turned; the piston 20 cannot rotate and accordingly does not cause sliding friction which might lead to localized wear on the diaphragm.

From what has been described above it is therefore evident that the invention achieves the proposed aim and objects, and in particular the fact is stressed that a diaphragm valve for compressed or liquefied gases is provided which allows to increase considerably the service life of the diaphragm, thanks to the fact that the presence of at least one metallic disk having a diameter that is less than the diameter of said diaphragm such that said at least one metallic disk is arranged inside said ring-shaped protruding portion, provides a continuity of the deformed geometry of the underlying diaphragm, avoiding the occurrence of wrinkles or deformations which might be impressed by the pressure applied to the diaphragms.

Another important aspect further consists in that having provided the upper piston so that it can only perform a translational motion and cannot rotate allows to avoid any sliding friction, which inevitably causes wear.

The invention thus conceived is susceptible of numerous modifications and variations, all of which are within the scope of the inventive concept.

All the details may further be replaced with other technically equivalent elements.

In practice, the materials used, as well as the contingent shapes and dimensions, may be any according to requirements.

The disclosures in EPA No. 05425884.3 from which this application claims priority are incorporated herein by reference.

What is claimed is:

1. A diaphragm valve for compressed or liquefied gases, comprising a valve body which defines an inlet which can be associated with a pressurized gas cylinder and forms a gas outlet port, a closure port being provided between said inlet and said outlet port, a gasket acting on said closure port and being supported by a flow control element, which engages the internal face of a diaphragm which is directly engaged between the valve body and a ring-shaped protruding portion of a bush, on the outer face of said diaphragm there acts a pusher piston, which can be actuated by means of an external knob, and further comprising, between said diaphragm and said pusher piston, at least one metallic disk having a diameter that is less than the diameter of said diaphragm such that said at least one metallic disk is arranged inside said ring-shaped protruding portion.

2. The diaphragm valve according to claim 1, wherein said bush is connected to the upper part of said valve body and forms a threaded seat for engagement with a threaded rod which is connected to said knob and forms, at the end directed toward said diaphragm, the region for accommodating said at least one metallic disk.

3. The diaphragm valve according to claim 1, comprising a plurality of mutually superimposed metallic disks having diameter that is less than the diameter of said diaphragm such that said at least one metallic disk is arranged inside said ring-shaped protruding portion.

4. The diaphragm valve according to claim 1, comprising rotation-preventing means which act on said pusher piston.

5. The diaphragm valve according to claim 4, wherein said rotation-preventing moans comprise a polygonal shape of said pusher piston which is accommodated, so that it can perform a translational motion, in a corresponding polygonal seat formed by a bush.

* * * * *